US011561886B2

(12) United States Patent
Bhandarkar et al.

(10) Patent No.: US 11,561,886 B2
(45) Date of Patent: Jan. 24, 2023

(54) OPEN DATA PROTOCOL PERFORMANCE TEST AUTOMATION INTELLIGENCE (OPT-AI)

(71) Applicant: SAP SE, Walldorf (DE)

(72) Inventors: Dinesh Bhandarkar, Bangalore (IN); Arpitha Shirdish, Bangalore (IN); Sandeep Joy, Udupi (IN); Shuva Ranjan Sen Sharma, Bangalore (IN)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 16/576,618

(22) Filed: Sep. 19, 2019

(65) Prior Publication Data

US 2021/0089435 A1 Mar. 25, 2021

(51) Int. Cl.
*G06F 11/36* (2006.01)
*G06F 8/41* (2018.01)

(52) U.S. Cl.
CPC .......... *G06F 11/3672* (2013.01); *G06F 8/433* (2013.01); *G06F 11/3604* (2013.01)

(58) Field of Classification Search
CPC ....... G06F 11/36–3696; G06F 8/00–78; G06F 11/3672; G06F 11/3604; G06F 8/433
See application file for complete search history.

(56) References Cited

U.S. PATENT DOCUMENTS 5,671,415 A * 9/1997 Hossain .................... G06F 8/20 700/96
9,559,928 B1 * 1/2017 Porter ................. H04L 41/5058
2006/0195817 A1 * 8/2006 Moon ................... G06F 11/368 717/104
2007/0136024 A1 * 6/2007 Moser ................. G06F 11/3688 702/119
2007/0174309 A1 * 7/2007 Pettovello ........... G06F 16/2246
2009/0307763 A1 * 12/2009 Rawlins .............. G06F 11/2294 714/E11.002

(Continued)

OTHER PUBLICATIONS

Mann, Gideon, et al. "Modeling the Parallel Execution of {Black-Box} Services." 3rd USENIX Workshop on Hot Topics in Cloud Computing (HotCloud 11). 2011. (Year: 2011).*

(Continued)

*Primary Examiner* — S. Sough
*Assistant Examiner* — Joanne G Macasiano
(74) *Attorney, Agent, or Firm* — Klarquist Sparkman, LLP

(57) ABSTRACT

A testing scenario (forming part of a computing environment executing a plurality of applications) is initiated to characterize performance of the applications. During the execution of the testing scenario, various performance metrics associated with the applications are monitored. Thereafter, data characterizing the performance metrics is provided (e.g., displayed, loaded into memory, stored on disk, transmitted to a remote computing system, etc.). The testing scenario is generated by monitoring service calls being executed by each of a plurality of automates across the applications, generating a service request tree based on the monitored service calls for all of the applications, and removing cyclic dependencies in the service request tree such that reusable testing components are only used once. Related apparatus, systems, techniques and articles are also described.

18 Claims, 12 Drawing Sheets

(56) References Cited

U.S. PATENT DOCUMENTS

| | | | | |
|---|---|---|---|---|
| 2010/0312762 | A1* | 12/2010 | Yan | G06F 16/24532 707/716 |
| 2013/0060507 | A1* | 3/2013 | Kianovski | G06F 11/3668 702/123 |
| 2014/0215435 | A1* | 7/2014 | Goldstein | G06F 8/72 717/120 |
| 2015/0046363 | A1* | 2/2015 | McNamara | G06Q 10/0635 705/333 |
| 2015/0212920 | A1* | 7/2015 | Kraus | G06F 11/3006 717/127 |
| 2017/0090876 | A1* | 3/2017 | Hale | G06F 16/2246 |
| 2017/0177416 | A1* | 6/2017 | Altman | G06F 11/3414 |
| 2017/0300402 | A1* | 10/2017 | Hoffner | G06F 11/3664 |
| 2020/0327044 | A1* | 10/2020 | Pi | G06F 11/3684 |

OTHER PUBLICATIONS

Sambasivan, Raja R. Diagnosing performance changes in distributed systems by comparing request flows. Diss. Carnegie Mellon University, 2013. (Year: 2013).*

* cited by examiner

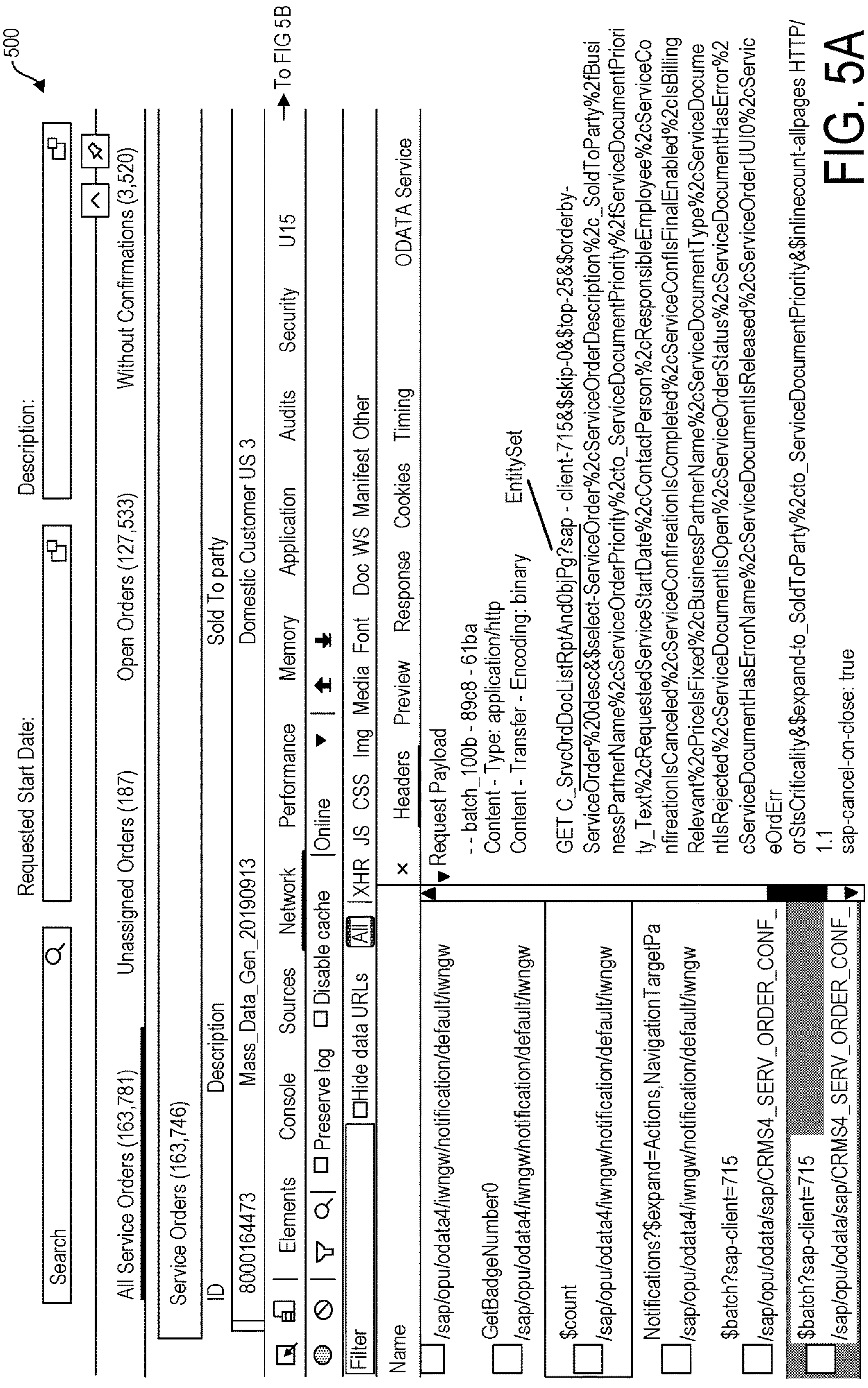

FIG. 5A

*Screenshot showing a service order application interface with browser developer tools displaying network requests. Top portion shows search fields (Search, Requested Start Date, Description) and order category tabs: All Service Orders (163,781), Unassigned Orders (187), Open Orders (127,533), Without Confirmations (3,520). Service Orders (163,746) table shows ID 800164473, Description "Mass_Data_Gen_20190913", Sold To party "Domestic Customer US 3", U15.*

*Developer tools panel shows tabs: Elements, Console, Sources, Network, Performance, Memory, Application, Audits, Security. Filter options include "Hide data URLs", "Disable cache", "Preserve log", and filter "Online". Request type tabs: All, XHR, JS, CSS, Img, Media, Font, Doc, WS, Manifest, Other.*

Name:
- /sap/opu/odata4/iwngw/notification/default/iwngw
- GetBadgeNumber0
- /sap/opu/odata4/iwngw/notification/default/iwngw
- $count
- /sap/opu/odata4/iwngw/notification/default/iwngw
- Notifications?$expand=Actions,NavigationTargetPa
- /sap/opu/odata4/iwngw/notification/default/iwngw
- $batch?sap-client=715
- /sap/opu/odata/sap/CRMS4_SERV_ORDER_CONF_
- $batch?sap-client=715
- /sap/opu/odata/sap/CRMS4_SERV_ORDER_CONF_

Tabs: Headers  Preview  Response  Cookies  Timing

▶ Request Payload
--batch_100b-89c8-61ba
Content-Type: application/http
Content-Transfer-Encoding: binary        EntitySet GET C_SrvcOrdDocListRptAnd0biPg?sap-client=715&$skip=0&$top=25&$orderby-ServiceOrder%20desc&$select-ServiceOrder%2cServiceOrderDescription%2c_SoldToParty%2fBusinessPartnerName%2cServiceOrderPriority%2cto_ServiceDocumentPriority%2fServiceDocumentPriority_Text%2cRequestedServiceStartDate%2cServiceConfirmationIsCompleted%2cServiceConfirmationIsFinalEnabled%2cIsBillingRelevant%2cPriceIsFixed%2cServiceConfirmationIsCompleted%2cBusinessPartnerName%2cServiceDocumentType%2cServiceDocumentIsCanceled%2cServiceConfirmationsOpen%2cServiceDocumentHasError%2cServiceDocumentIsRejected%2cServiceDocumentHasErrorName%2cServiceDocumentIsReleased%2cServiceDocumentHasError%2cServiceDocumentHasErrorStsCriticality&$expand=to_SoldToParty%2cto_ServiceDocumentPriority&$inlinecount-allpages HTTP/1.1
sap-cancel-on-close: true ODATA Service → To FIG 5B

OPEN DATA PROTOCOL PERFORMANCE TEST AUTOMATION INTELLIGENCE (OPT-AI)

TECHNICAL FIELD

The subject matter described herein relates to improved techniques for testing software applications having common functionality.

BACKGROUND

Computing environments are becoming increasingly complex with certain cloud-based platforms executing hundreds, if not, thousands of applications. Performance and quality assurance testing of such applications can be costly in terms of consumption of computing resources. In addition, such testing can require several hours depending on the number and complexity of the various applications.

SUMMARY

In a first aspect, a testing scenario (forming part of a computing environment executing a plurality of applications) is initiated to characterize performance of the applications. During the execution of the testing scenario, various performance metrics associated with the applications are monitored. Thereafter, data characterizing the performance metrics is provided. The testing scenario is generated by monitoring service calls being executed by each of a plurality of automates across the applications, generating a service request tree based on the monitored service calls for all of the applications, and removing cyclic dependencies in the service request tree such that reusable testing components are only used once.

The providing of data can include one or more of displaying the data characterizing the performance metrics, loading the data characterizing the performance metrics into memory, storing the data characterizing the performance metrics, or transmitting the data characterizing the performance metrics to a remote computing system.

The service calls can be according to the open data protocol (ODATA). The testing scenarios can be configured so as to only execute one ODATA service once.

The computing environment can include a plurality of clients executing the applications in connection with a cloud-based server.

The monitoring can include capturing and storing snippets of the calls. Further, entity set details can be captured and stored for the calls.

A longest path in the service request tree can be identified as a critical path.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for testing scenarios with optimal testing paths that can greatly reduce an amount of time to test a large number of applications interfacing with or being executed by a cloud server. In addition, fewer computing resources are consumed as a result of the reduced testing times.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 5A-B are diagrams illustrating a second graphical user interface view;

DETAILED DESCRIPTION

Figure 1:
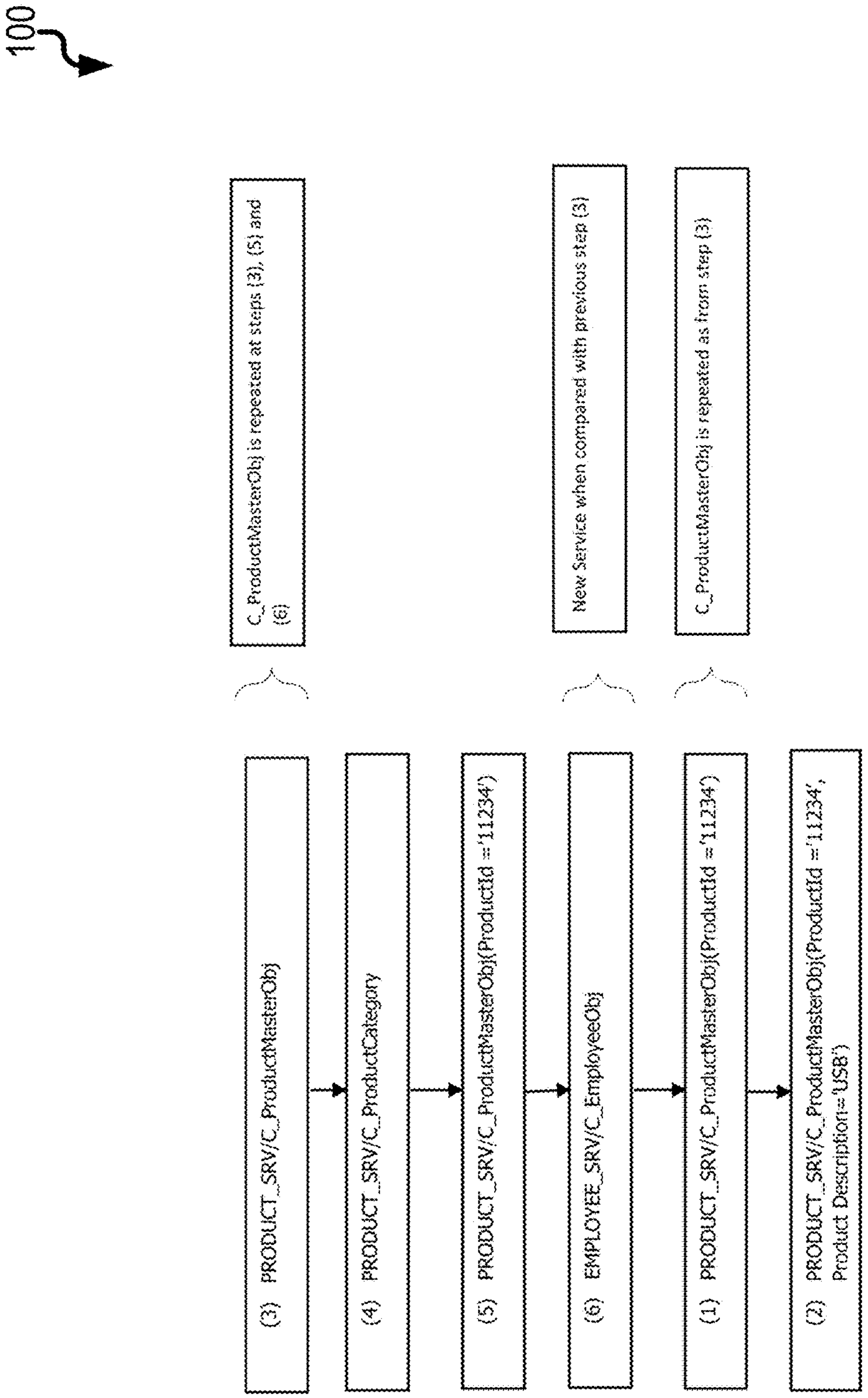
FIG. 1 is a diagram illustrating an ordered sequence of requests.

The current subject matter is directed to providing enhanced testing for distributed computing systems employing numerous (e.g., hundreds, etc.) of applications. Such testing can relate to various aspects of how such applications are performing including, for example, whether certain graphical user interface elements are properly rendering and whether such elements, when activated, cause the corresponding action to occur.

The applications as provided herein, can call a remote server using various protocols including, for example, Open Data Protocol (ODATA). The ODATA protocol can be used to fetch data from a database. ODATA can also be used to display the fetched data in the user interface (UI) (which can, for example, be enabled via the SAPUI5 programming language).

As will be described in further detail below, as part of identifying critical paths for determining which tests to selectively execute, ODATA Services can be captured based on user scenarios. From a testing perspective, an HTTP traffic capturing tool can be used to intercept the http/s calls between a client and a server to capture the services. This capturing can be accomplished by running user interface (UI) testing automates (i.e., a script for performing testing of an application) such as START (Simple Test Automation for Regression Tests) with at least three dry runs followed by main runs until the standard deviation is less than equal to 9% and validating it with defined thresholds.

From the customer usage perspective, service usage frequency can be captured from system access logs or cloud reporting tools. Service level information gathered from both the testing perspective and the customer usage perspective can be further extended for workload modeling, dynamic scoping, load, linearity testing and sizing solutions to cater to the CICD (continuous integration and deployment) needs of cloud solutions.

During an initial testing run (i.e., a dry run), and as will be described in further detail below with regard to diagram 200 of FIG. 2, an OPT-AI application/tool 202 can have three main components. Recording engine 204 of OPT-AI can be used for recording the OData service. Test Scheduler of OPT-AI 206 can be used for scheduling the tests such as critical path tests (longest path which gets generated, duplicate entities removal, etc.), dynamic path tests 232 (determined taking the feed from cloud reporting tools), load and linearity tests. An analyzer of OPT-AI 208 can be used for analysis of results and trends over different releases. An adapter engine (which can include components: 206, 210, 216, 212, 220, 222, 224, 232) can automatically correct and update the service XML, to the Database (226) if there is change to service query parameters and correlation values. If it encounters new service query which does not exists, then it's added to the service XML after the required preprocessing) of open data protocol test automation intelligence (OPT-AI) as provided herein can capture HTTP/s requests and perform preprocessing of XHR (XML HTTP Request) requests to handle user inputs parameters, correlation parameters from the server. This processed information can be stored as an XML file to a database after being encoded and compressed as a ZIP file.

Whenever a user scenario or test case changes, the adaptor engine can autocorrect the service automate by firing the UI automates. The adaptor engine can also adapt the service xml for changes in user flow, parameters and server correlation values. The user input parameters can be read from the UI automate and service requests along with server correlation values can be read from the HTTP/s interception log. Both input parameters, correlated service requests are passed to a xml parser to generate or update ODATA service xml.

During the test/delivery phase, the OPT-AI tool as provided herein can be configured from UI and ODATA services that are fired according to the user scenarios and performance metrics for the corresponding services are captured at the application server. These captured performance metrics captured can be further validated against the thresholds (i.e., pre-defined performance thresholds such as response time, etc.) and rendered back on an OPT-AI UI along with the trend analysis and service usage metrics. KPI verification per service can be done based on CDS (Core Data Service) view service quality.

As an example, there are two applications which consume ODATA services:

- PRODUCT_SRV→ This is an ODATA Service for an application wherein it has various entityset for performing operations on products like selecting different products, updating/creating new products, selecting products along with categories with dealer relationship etc.
- EMPLOYEE_SRV→ This is another ODATA Service for another application which has entitysets for displaying list of employees, list manager-employee relationship hierarchy, various products used by different employees.

The ODATA services of different applications can be stored in xml format in one or more databases. An example service is provided below:

```
<xml>
<Services>
<Service>
    PRODUCT__SRV
    <EntitySet>
        <Name> C__PRODUCTMASTEROBJ </Name>
        <EntityRequestType> GET </EntityRequestType>
        <EntityUsage> 10 </EntityUsage>
        <Params> 2
            <Param1> ProductId = '1234' </Param1>
            <Param2> ProductDescription = 'USB' </Param2>
        </Params>
Performance__in__Millisec> 200 </Performance__in__Millisec>
    </EntitySet>
    <EntitySet>
        <Name> C__PRODUCTCATEGORY </Name>
        <EntityRequestType> GET </EntityRequestType>
        <EntityUsage> 2 </EntityUsage>
        <Params> 2
            <Param1> ProductCategory = '2' </Param1>
            <Param2> ProductId = '1234' </Param2>
        </Params>
        Performance__in__Millisec> 100 </Performance__in__Millisec>
    </EntitySet>
</Service>
</Services>
</xml>
```

ODATA service information and corresponding entity set details can be obtained using a tool for recording and playing the script. Such information (including a snippet of the call) can be stored in a format such as SampleXML.xml file which contains the XML format. Such file can also include the ODATA execution time such as its corresponding behavior over days in terms of execution time, etc. The adaptor engine can parse all these XML formats and create a new path by parsing all the ODATA services and its entity sets. The longest path is referred to herein as a critical path which has most coverage with no redundancy (i.e., no duplicate services need to be executed, etc.).

The adaptor engine intelligently finds the path of execution by creating the optimized critical path which has maximum coverage of various ODATA without any duplicate execution. Initially, a service request tree is formed to identify the dependency across different services (i.e., which services use the same XHR requests, etc.). The same services or same entity sets may be called from different apps. Thus, executing the same services/entity sets via different paths decreases the execution speed in a cloud-based computing environment. Hence there is a need to optimize the path and find the optimal solution which covers all the test execution without any cycles across same services through various paths. Thereafter, the adaptor engine removes, from the service request tree, all cyclic dependency across various applications by creating the tree like structure. With this arrangement, reusable components are tested only once, thus optimizing execution time.

The adaptor engine can also identify other services and corresponding entity sets that exist in the system but are not covered by the ODATA test cases repository.

In some variations, the adaptor engine can find a critical path based on the most frequently used services based on various information/feeds derived from cloud reporting tools (e.g., SAP Analytics Service Provider, etc.). This arrangement can help the end user with dynamic scoping of test scenarios (i.e., adaptively change testing scenarios based on changing cloud reporting metrics, etc.).

The adaptor engine can provide missing services which are not tested for performance by the end user (i.e., additional UI automates can be suggested). This functionality can help an end user to create the test case for such scenario.

Thus, the OPT-AI tool as provided herein can intelligently execute testing scenarios covering large numbers of applications by optimizing testing paths and only moving through critical path. By only testing along the critical path, the total testing execution time can be greatly reduced. Further, the OPT-AI tool can provide various UI mechanisms to guide an end user by providing missing services/entity set which do not have a corresponding testing scenario.

As an example, Application 1: "Manage Products" is an application that lists all the products of various categories and allows to update/create new products, also the application shows various customers using various product details. Network calls can be monitored to provide a list of all requests that go to the server and the corresponding results. Next, the "GET", "POST", "PUT" ODATA calls can be monitored and processed.

"Manage Products" application uses "PRODUCT_SRV" ODATA service. This service has following entitysets:

1. C_PRODUCTMASTEROBJ—This will list all the products
2. C_PRODUCTCATEGORY—This will have various categories of products In ODATA, a "GET" request on entityset can be done by passing parameters i.e. if specific product information is to be retrieved, say "USB" product which has product id=123 then the ODATA request will be as follows: GET C_PRODUCTMASTEROBJ(ProductId='123')

The above entityset C_PRODUCTMASTEROBJ will retrieve the "USB" product information. The parameters i.e. ProductId in this case acts like a filter wherein we are fetching specific details using the entityset calls.

From an application "Manage Products", when the user clicks on button to list all the products then it results in following sequence of calls:

1. The application will call the PRODUCT_SRV ODATA service to retrieve the metadata.
2. PRODUCT_SRV service will have a GET request as follows: GET C_PRODUCTMASTEROBJ?skip=0&top=25&ProductId, ProductDescription, ProductCost, ProductDiscount
   (This will list all the products. As we have provided top=25 in the call, it will fetch first 25 records from the database)
3. Another call might be to fetch the product category GET C_PRODUCTCATEGORY?skip=0&top=25&ProductId, ProductCategory, ProductCategoryDiscount
   (This will list all the product categories associated with each product. As we have provided top=25 in the call, it will fetch first 25 records from the database)

As another example Application 2: "Manage Employees" is an application that lists all the employees along with products used by the different employees. Manage Employees uses the EMPLOYEE_SRV ODATA service. This service has following entitysets:

1. C_EMPLOYEEOBJ—This will list all the employees
2. C_EMPMANAGERRELATION—This will list the employees along with his manager details.
3. C_BUYPRODUCT—This will trigger the purchase order creation This application will call PRODUCT_SRV ODATA service to get list of all products. From this list, the employee can choose any product and buy the product using C_BUYPRODUCT entityset call.

The following shows how an optimized tree can be built.

Manage Product application will have PRODUCT_SRV, Manage Employee application will have EMPLOYEE_SRV.

The following conventions can be used to represent a entityset being triggered by an ODATA call i.e. PRODUCT_SRV ODATA service will call "GET" request with entityset C_PRODUCTMASTEROBJ and it is represented as: PRODUCT_SRV/C_PRODUCTMASTEROBJ Network calls are monitored and all ODATA calls can be filtered by the OPT-AI tool provided herein.

Suppose the Manage Product and Manage Employee applications have following sequence of calls:

Manage Products application as shown in FIG. 1:

1. PRODUCT_SRV/C_PRODUCTMASTEROBJ
2. PRODUCT_SRV/C_PRODUCTCATEGORY
3. PRODUCT_SRV/C_PRODUCTMASTEROBJ (ProductID='1234')

Manage Employee application as shown in FIG. 1:

1. EMPLOYEE_SRV/C_EMPLOYEEOBJ
2. PRODUCT_SRV/C_PRODUCTMASTEROBJ (ProductID='1234')
3. PRODUCT_SRV/C_PRODUCTMASTEROBJ (ProductID='1234', ProductDescription='USB')

FIG. 1 is a diagram 100 illustrating a series of captured XHR requests listed in a sequence in which they are received from a browser. This example relates to a manage products and manage employee application that comprises a user interface. There are 2 ODATA services which are consumed by this application. They are:

PRODUCT_SRV, EMPLOYEE_SRV

PRODUCT_SRV: Manage Product application uses the ODATA service PRODUCT_SRV. But this application consumes all the entity sets listed within the service. Following entity sets are consumed by the application:

C_PRODUCTMASTEROBJ—This will list all the products

C_PRODUCTMASTERCATEGORY—This will have various categories of products

EMPLOYEE_SRV: Manage Employee application uses the EMPLOYEE_SRV ODATA service. Manage Employee application might not consume all the entity set listed within the service like Get request. Following entity sets are consumed by the application:

C_EMPLOYEEOBJ—This will list all the employees

Figure 6:
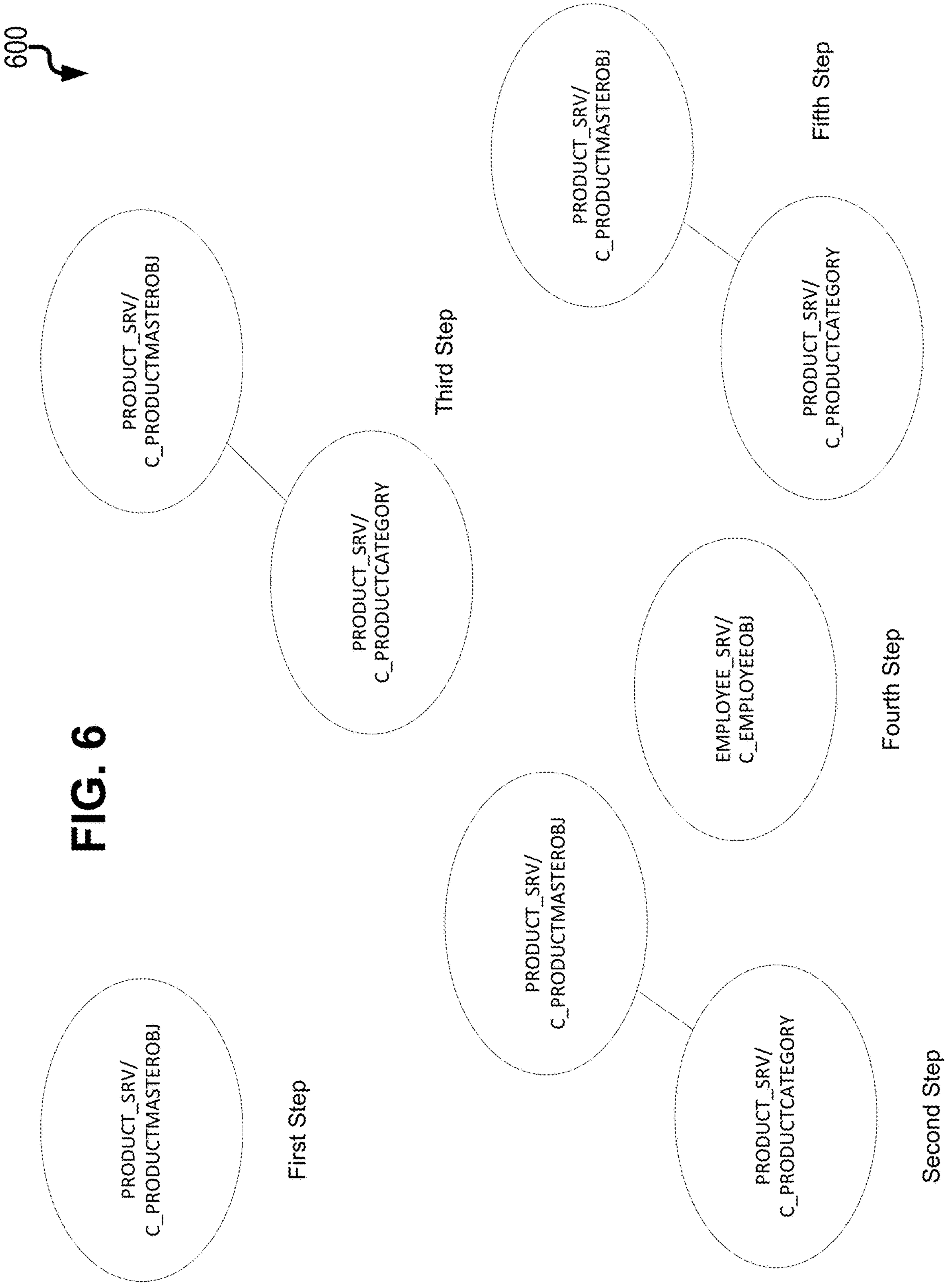
FIG. 6 is a diagram illustrating creation of a service tree.

C_EMPMANAGERRELATION—This will list the employees along with his manager details C_BUYPRODUCT—This will trigger the purchase order creation With reference to diagram 600 of FIG. 6, a tree is created for each service specified in FIG. 1. With this example, there are two trees for two services. At a first step, there is simply C_PRODCUTMASTEROBJ.

Each ODATA service is a tree. As such, there will be many tree structures. The ODATA service root node information is stored in a hashmap.

| ServiceInfoKey | TreeReferenceAddress of Root Node |
|---|---|
| PRODUCT__SRV | 0x12345678 (3$^{rd}$, 5$^{th}$ and 6thstep root node is updated) |
| EMPLOYEE__SRV | 0x6789432 (4$^{th}$ step new root node is created) |

Whenever a new call is being done, the service is looked up in the hashmap such as by:

```
If <Service> is 'Not Present' then
    Create a new tree node
    Add new Service to the hashmap along with root node
        address
Else if <Service> root node is restructured then
    Update the root node Address for the <service>
EndIf
```

The node of the tree can have a data structure like as follows:

| Left Child Address | Right Child Address | EntitySet | IsVisited | Execution Status (Error/ Success) | Current Performance Measurement | ODATA Req. Type (Get/Post etc.) | Array of References |
|---|---|---|---|---|---|---|---|

Left Child Address/Right Child Address: Node address.

EntitySet: Name of the entityset.

IsVisited: Is the node already visited?

Execution Status: Is the execution successful or failed. This helps to take the corrective action later.

Current Performance Measurement: Time taken to execute the ODATA by the entity set.

ODATA Request Type: This refers to type of ODATA request i.e. GET/POST/PUT etc.

Array of References means how many times the nodes is getting referenced with different parameters i.e. C_PRODUCTMASTEROBJ—1 time is referenced from application 1 C_PRODUCTMASTEROBJ(ProductId='123')—1 time is referenced from application 2 with 1 parameters C_PRODUCTMASTEROBJ(ProductId='123', ProductDescription='USB')—1 time is referenced from application 2 with 2 parameters.

The data structure for the service can be stored as follows:

| Service Name | EntitySet | IsSkipped | Parameters & Values | No. of Parameters (Calculated runtime) | ODATA Req. Type (Get/Post etc.) |
|---|---|---|---|---|---|
| | | | | | |

```
        If ODATA Req. Type is 'GET' then
            If Array of References has Parameter entry then
                Update the respective <service> entityset with
Parameter & Values
            Else
                Create a new node
                Update the node information like EntitySet, IsVisited,
ODATA Request Type, Array of References
                Insert in binary tree and update left and right child
                address
            EndIf
    EndIf
```

Cloud Reporting Tool: Any Cloud vendor like AWS, MS Azure, SAP Cloud etc. will provide API to perform cloud analytics over the APIs which passes through the cloud network.

The below example shows the values retrieved from the SAP Cloud Reporting Analytics. This shows the usage of ODATA service by the customer. OPT-AI will convert the usage to percentage. This values are later aggregated with the specific nodes that are found.

| Application | Service Name | Usage | Percentage Conversion (Weight Assignment) |
|---|---|---|---|
| Manage Products | PRODUCT_SRV/ C_PRODUCTMASTEROBJ | 30 | 0.3 |
| Manage Products | PRODUCT_SRV/ C_PRODUCTCATEGORY | 20 | 0.2 |

-continued

| Application | Service Name | Usage | Percentage Conversion (Weight Assignment) |
|---|---|---|---|
| Manage Employees | EMPLOYEE_SRV/ C_EMPLOYEEOBJ | 50 | 0.5 |

Figure 2:
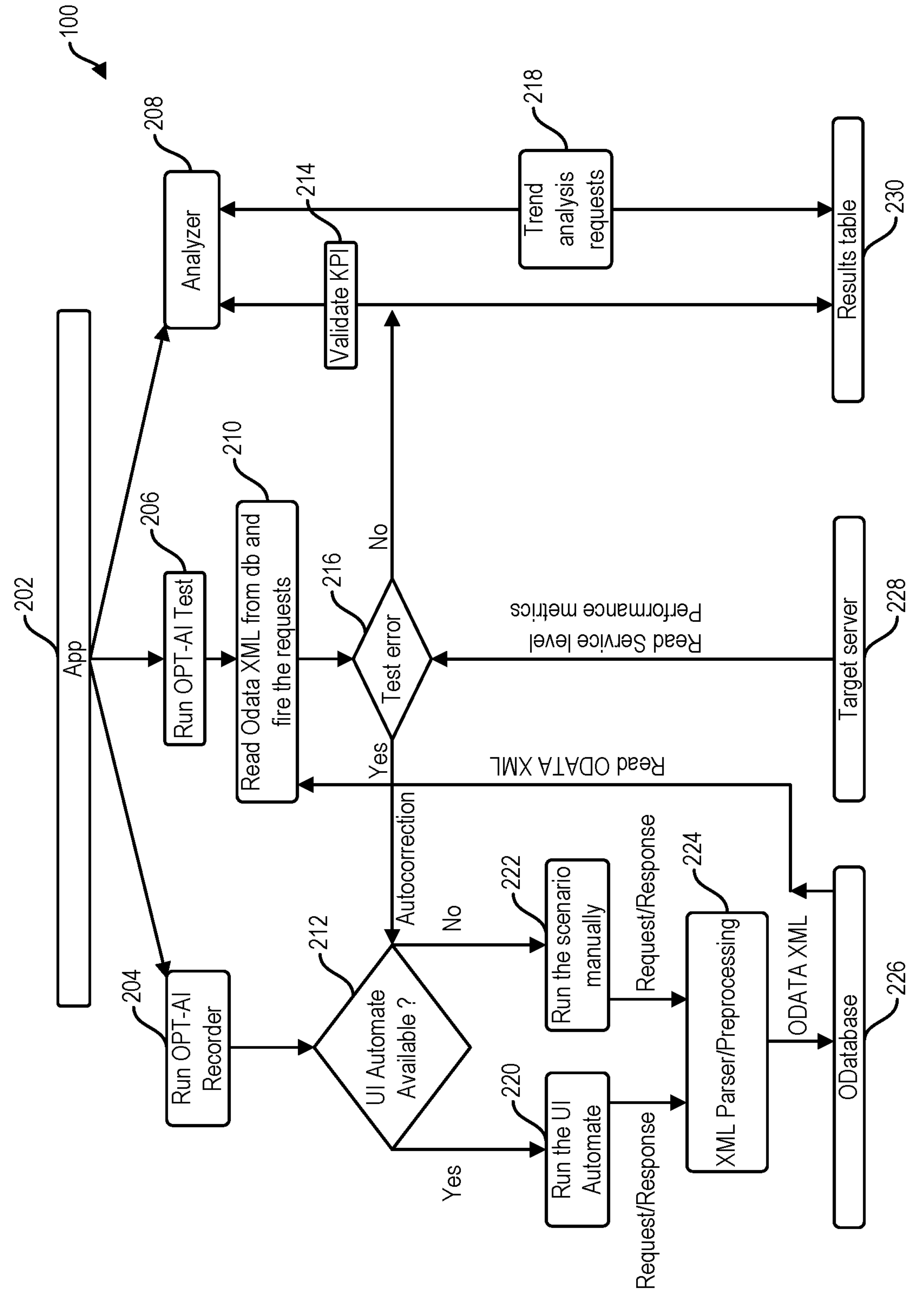
FIG. 2 is a diagram illustrating aspects of an OPT-AI as provided herein.

FIG. 2 is a diagram 200 illustrating a testing environment for an application 202 (which forms part of numerous applications in a cloud-based computing environment). The application 202 interacts with a target server 228 with various testing information being stored in a database 226 along with testing results being stored in a results table 230 (which may be in any sort of database). An OPT-AI test can be run, at 206, which causes ODATA XML to be read from the database 226 and various requests specified therein can be fired (as part of a test). To Record OData Critical Path of any new application/scenario an OPT-AI recorder 204 can be run that actively monitors the various service calls that are triggered during executions of existing automate or manual run of scenario and saves the preprocessed ODATA XML 224 in to the repository at ODatabase 226 Further, after successful execution of the odata tests at 216, an analyzer 208 validates various KPIs 214 in connection with the testing and also provides various trend analysis requests 218 (i.e., report indicating testing times over certain time intervals, etc.). The testing is monitored, at 216, to determine if there are any errors. If test is not successful, autocorrection of critical path is triggered and at 212, it is determined whether a more appropriate UI automate (i.e., testing script) is available. If so, execution of such UI automate is initiated, at 220; otherwise, at 222, a manual run of a testing scenario is initiated (i.e., the user has to trigger the execution). The UI automate or the manual testing scenario are then parsed/preprocessed, at 224, and then stored in the database 226, as ODATA XML. This ODATA XML can then be used, at 210, to run the critical path ODATA tests. Critical path is further enhanced based on the feed from CRT tool 232 for dynamic path test. At 210, the user can choose to perform either of critical path or dynamic path tests based on requirements. (i.e., the process repeats).

Figure 3:
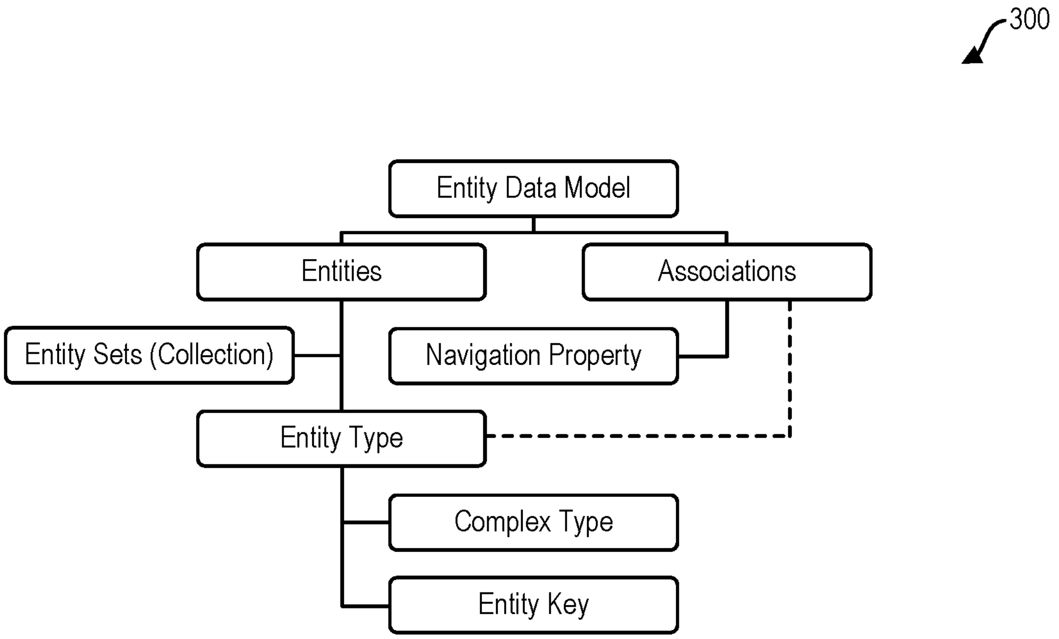
FIG. 3 is a diagram illustrating relationships of an ODATA service.

Entities are instances of entity types (e.g. Customer, Employee, etc.). Entity types are nominal structured types with a key. Entities consist of named properties and may include relationships with other entities. Entity types support single inheritance from other entity types. Entities are the core identity types in a data model. Entity sets are named collections of entities (e.g. Customers is an entity set containing Customer entities). An entity can be a member of at most one entity set. Entity sets provide the primary entry points into the data model. The metadata document is a static resource that describes the data model and type system understood by that particular OData service. Any ODATA service can follow the relationships shown in diagram 300 of FIG. 3.

Figure 4A:
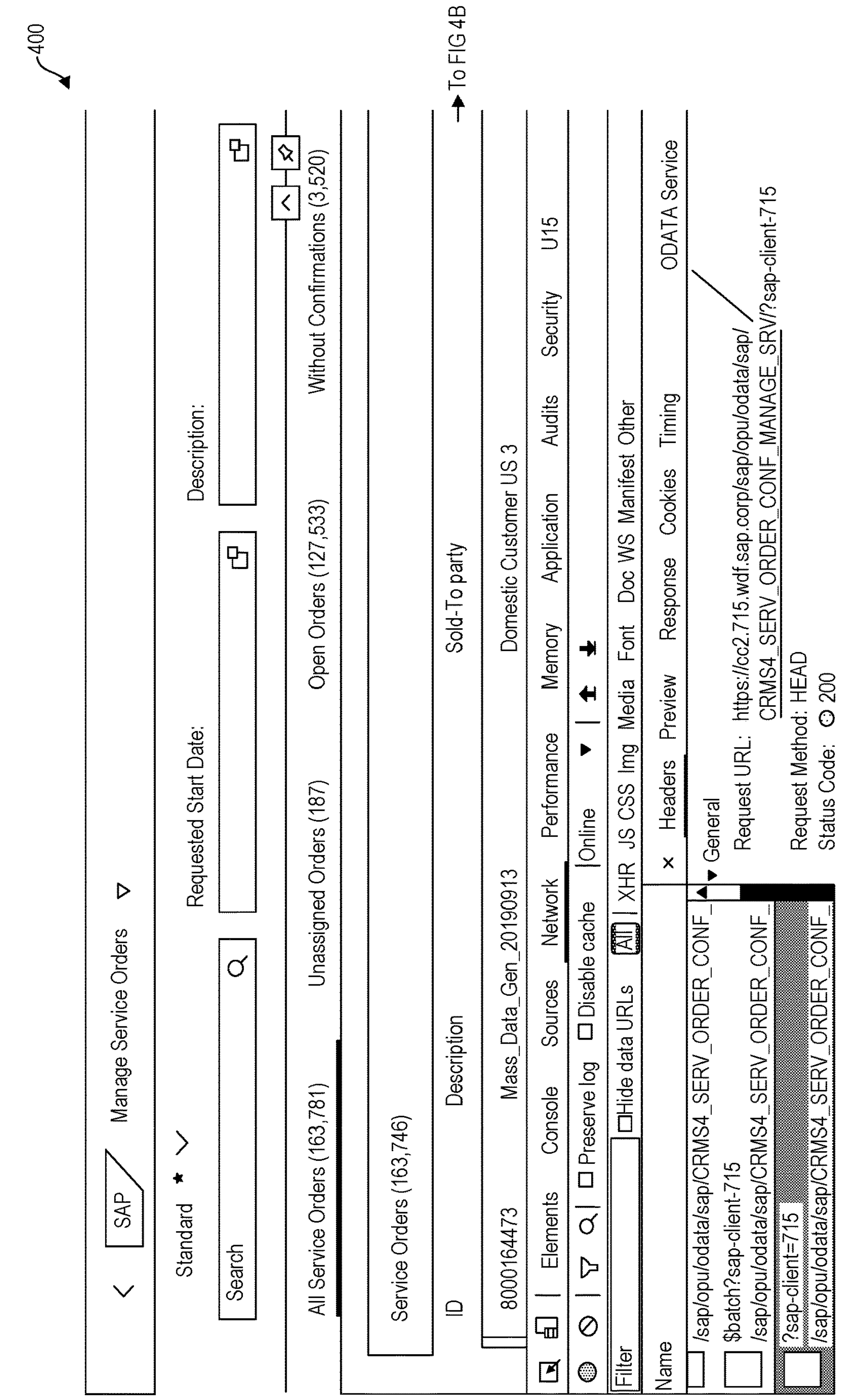
FIGS. 4A-B are diagrams illustrating a first graphical user interface view.
Figure 4B:
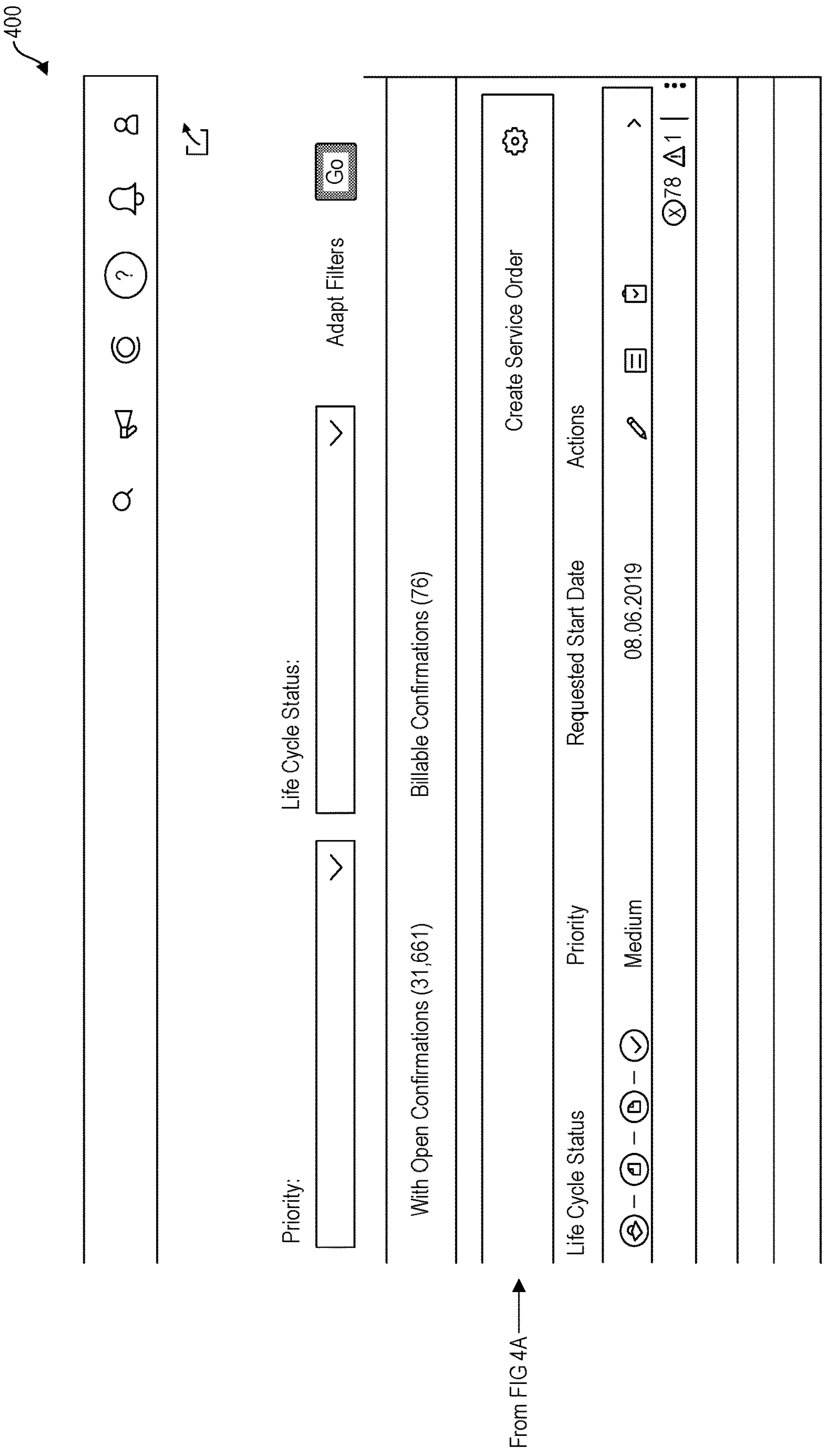
Figure 5B:
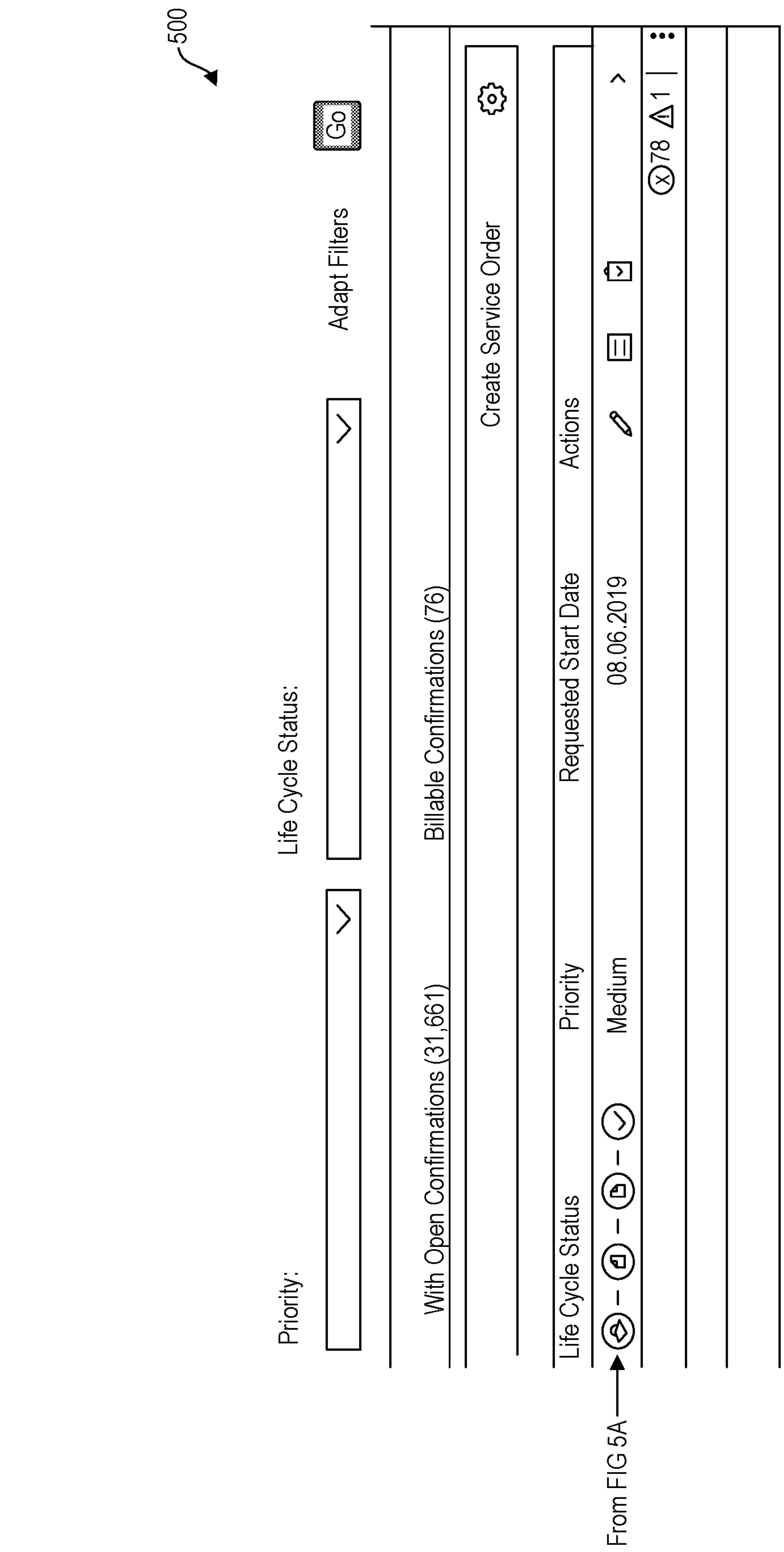

For an application, there can be more than 1 ODATA service. FIGS. 4A-B collectively provide a graphical user interface view 400 illustrating an actual service name in an application. With reference to graphical user interface 500 illustrated in FIGS. 5A-B, the example payload will have the entityset C_SrvcOrdDocListRptAndObjPg.

HashMap:

| Service Name | Root Node Reference |
|---|---|
| PRODUCT__SRV | 0x12345678 |
| EMPLOYEE__SRV | 0x6789432 |

Node Information

| Left Child Address | Right Child Address | Entityset | IsVisited | Execution__Status (Error/Success) | Current Performance Measurement | ODATA Request Type (GET/POST) | Array of References |
|---|---|---|---|---|---|---|---|

So in above, how many times the same entity set is called with different number of parameters is being monitored. There can be an entry in an array for different number of parameters referencing to the same entity set.

As shown above, the following sequence of execution can be taken for explaining the tree building logic:

Manage Products application:

1. PRODUCT_SRV/C_PRODUCTMASTEROBJ
2. PRODUCT_SRV/C_PRODUCTCATEGORY
3. PRODUCT_SRV/C_PRODUCTMASTEROBJ (ProductID='1234')

Manage Employee application:

1. EMPLOYEE_SRV/C_EMPLOYEEOBJ
2. PRODUCT_SRV/C_PRODUCTMASTEROBJ (ProductID='1234')
3. PRODUCT_SRV/C_PRODUCTMASTEROBJ (ProductID='1234', ProductDescription='USB')

The following steps references to diagram 600 of FIG. 6.

1st Step: PRODUCT_SRV/C_PRODUCTMASTEROBJ

When PRODUCT_SRV/C_PRODUCTMASTEROBJ call is processed, it is determined whether the PRODUCT_SRV service is present in the hashmap.

```
        If hashmap(PRODUCT__SRV) = found then
            Get tree node reference
    Else
                Create a new tree and make it is root
                Create an entry in the hashmap with the
                root node address
EndIf
```

In this case (and again referring to FIG. 6), as the root node is not present an entry in the hashmap is created and a new tree is created with entityset C_PRODUCTMASTEROBJ.

The following information is updated after creating a node as above. Node Information: IsVisited=TRUE, Array of Parameters: 0 Parameters: Number of times visited: 1, Value-NULL.

2nd Step: PRODUCT_SRV/C_PRODUCTCATEGORY

The new node can be inserted in descending order and follows the Binary Tree insertion programming methodology.

PRODUCT_SRV/C_PRODUCTCATEGORY→Node information is updated.

LeftChild of PRODUCT_SRV/C_PRODUCTMASTEROBJ is updated with node reference as PRODUCT_SRV/C_PRODUCTCATEGORY.

Left child and right child address for PRODUCT_SRV/C_PRODUCTCATEGORY is null as it does not have any child nodes.

IsVisited: TRUE

Array of References: 0 Parameters: Number of time visited: 1, Value-NULL

3rd Step: PRODUCT_SRV/C_PRODUCTMASTEROBJ (ProductID='1234')

In the hashmap, the ODATA Service PRODUCT_SRV can be found and, using this information, root node information can be obtained.

PRODUCT_SRV/C_PRODUCTMASTEROBJ—This node is already created.

Earlier it was having 0 Parameters. Now we are having 1 parameter passed

0 Parameters Hashmap: Number of times visited: 1, Value—NULL

1 Parameters Hashmap: ProductId, Number of times visited: 1, Value—1234

4th Step: EMPLOYEE_SRV/C_EMPLOYEEOBJ

The new node is created with the hashmap for the service EMPLOYEE_SRV.

The new node information is created as above with values:

IsVisited: TRUE

0 Parameters Hashmap: Number of times visited: 1, Value—NULL

5th Step: PRODUCT_SRV/C_PRODUCTMASTEROBJ (ProductID='1234')

Now this is referencing the already visited service earlier with 1 parameter. This node with 1 parameter for entityset C_PRODUCTMASTEROBJ is already created in 3rd step.

PRODUCT_SRV/C_PRODUCTMASTEROBJ—This node is already created.

Earlier it was having 0 Parameters. Now we are having 1 parameter passed.

0 Parameters Hashmap: Number of times visited: 1, Value—NULL

1 Parameters Hashmap: ProductId, Number of times visited: 2, Value—1234

The productId parameter is already populated earlier in 3rd step. Now in this step, we will only update the number of times visited field.

6th Step: PRODUCT_SRV/C_PRODUCTMASTEROBJ (ProductID='1234', ProductDescription='USB')

PRODUCT_SRV/C_PRODUCTMASTEROBJ—This node is already created.

Earlier it was having 0 Parameters and 1 parameter. Now we are having 2 parameter passed 0 Parameters Hashmap: Number of times visited: 1, Value—NULL 1 Parameters Hashmap: ProductId, Number of times visited: 2, Value—1234

2 Parameters Hashmap: ProductId, ProductDescription, Number of times visited: 1, Value: 1234, USB A new entry can be created in array of references field with above details.

The same steps can be repeated for all various applications which results in a tree for each ODATA Service.

The application data structure is as follows:

| Service Name | Entity set | IsSkipped | Parameter and Values | Number of Parameters | ODATA Request Type |
|---|---|---|---|---|---|

Manage Products Application:

1. PRODUCT_SRV/C_PRODUCTMASTEROBJ
2. PRODUCT_SRV/C_PRODUCTCATEGORY
3. PRODUCT_SRV/C_PRODUCTMASTEROBJ (ProductID='1234')

The cloud reporting tool can then be checked as well as the ODATA API usage with different parameter usage. Accordingly, this can be added to number of times visited parameter within array of references field in a node.

Figure 7:
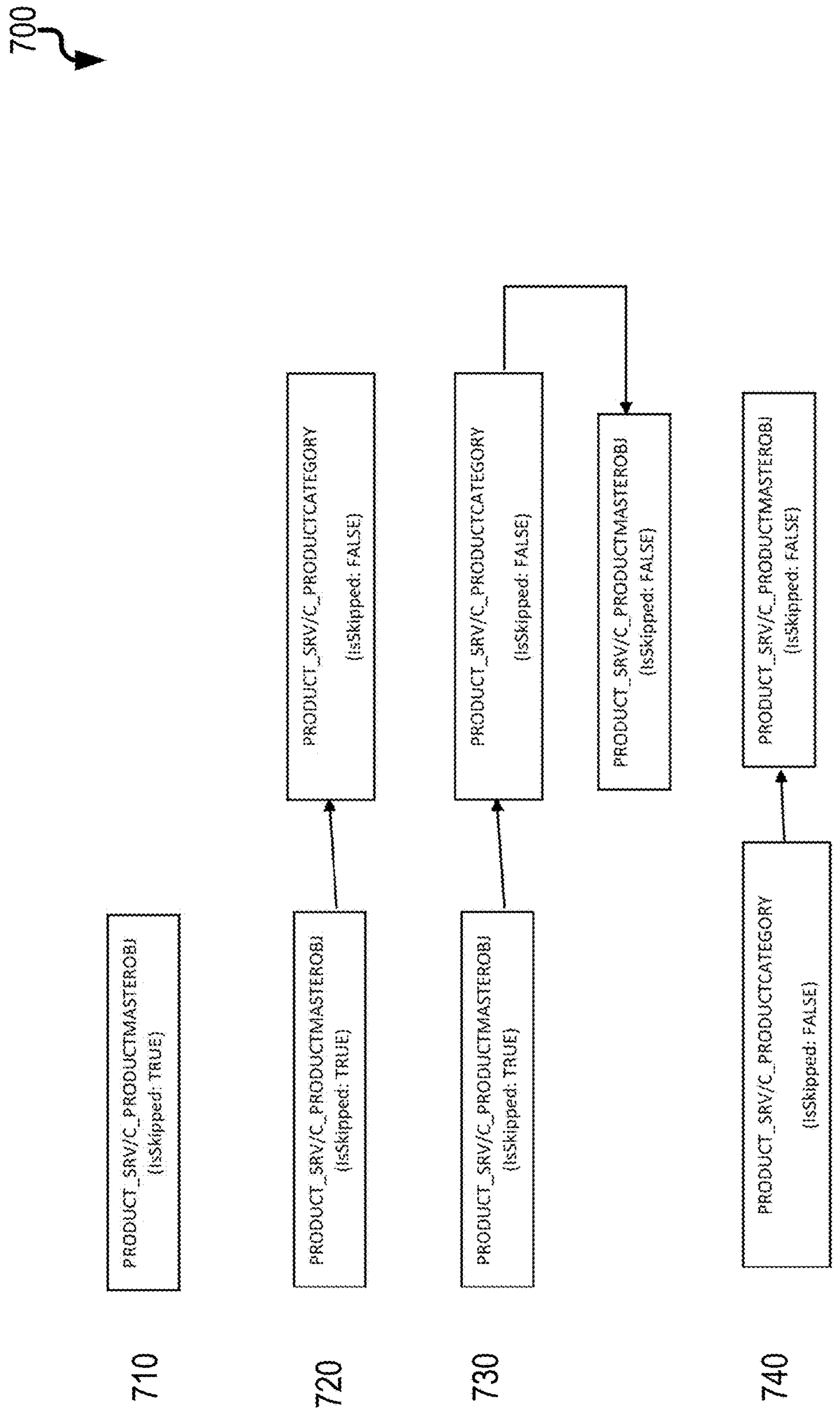
FIG. 7 is a first diagram illustrating determination of a critical path.

Once all of the trees are constructed, the applications critical path is determined as follows (and with reference to diagram 700 of FIG. 7):

For Manage Products Application:

PRODUCT_SRV/C_PRODUCTMASTEROBJ—This entity set is referenced 2 times with 1 parameter. But we are referencing the same with 0 parameter which are referenced only once. Hence the node is marked as skipped (see item 710).

PRODUCT_SRV/C_PRODUCTCATEGORY. With reference to item 720, the 2$^{nd}$ node is added with IsSkipped: False as it is referenced once and from no other path it is referenced. So it qualifies for performance test as show in item 730. PRODUCT_SRV/C_PRODUCTMASTEROBJ (ProductID='1234'). Here, the 1$^{st}$ node is marked as IsSkipped: TRUE, but in the 3$^{rd}$ node we have marked as IsSkipped: False. This is because with 1 parameter, the number of times the node is referenced is 2 times.

Hence it is highest references done for entity set C_ProductMasterObj with 1 parameter. So this qualifies for performance test. So the final critical path is illustrated as item 740.

Manage Employee application (referencing item 810 in diagram 800 of FIG. 8):

1. EMPLOYEE_SRV/C_EMPLOYEEOBJ
2. PRODUCT_SRV/C_PRODUCTMASTEROBJ (ProductID='1234')
3. PRODUCT_SRV/C_PRODUCTMASTEROBJ (ProductID='1234', ProductDescription='USB')

EMPLOYEE_SRV service references C_EMPLOYEEOBJ only once so it is considered for Performance test. 2$^{nd}$ node is already considered earlier so it is skipped. 3$^{rd}$ node is not qualified as number of times referenced is only once with 2 parameters but same entityset C_PRODUCTMASTEROBJ with 1 parameter is referenced is 2 times. Hence 3$^{rd}$ node is not considered for Performance Test.

Figure 8:
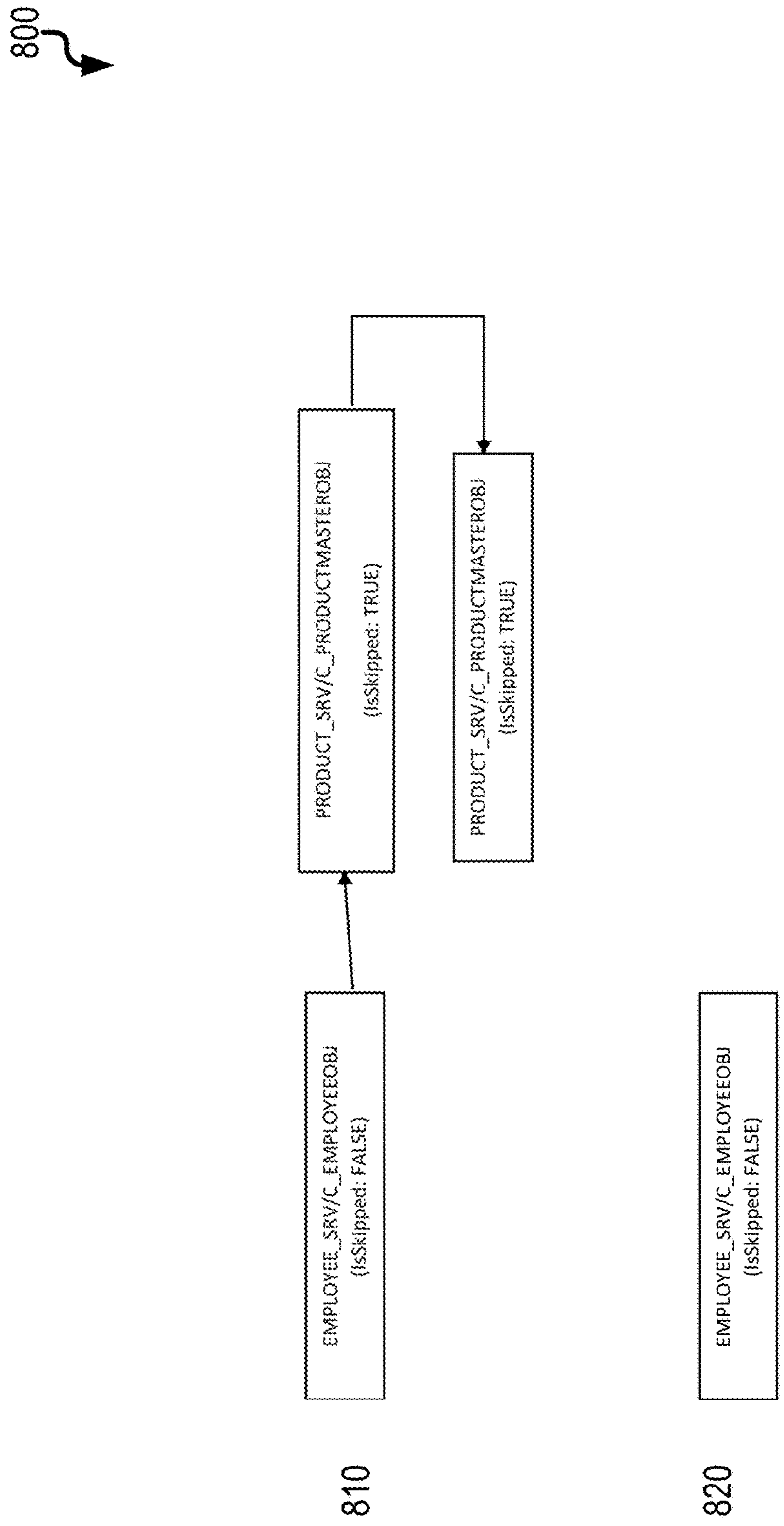
FIG. 8 is a second diagram illustrating determination of a critical path.

So final critical path for Manage Employee application will be as illustrated as item 820 in FIG. 8.

In total, there were six ODATA calls which triggered by the application, but for the performance test, only three ODATA calls were considered (PRODUCT_SRV/C_PRODUCTCATEGORY; PRODUCT_SRV/C_PRODUCTMASTEROBJ (IsSkipped: FALSE); EMPLOYEE_SRV/C_EMPLOYEEOBJ (IsSkipped: FALSE) from which the critical path was selected.

During the performance test, the performance measurement can be updated. Thus, each node is executed three times and it is considered as dry runs. After three dry runs, the main run was executed until a standard deviation less than 9% is obtained.

When the standard deviation is less than 9%, it means that a consistent performance measurement can be obtained. The performance mean can then be marked as current performance measurement. These steps can be followed for all of the nodes to calculate their respective performance.

Figure 9:
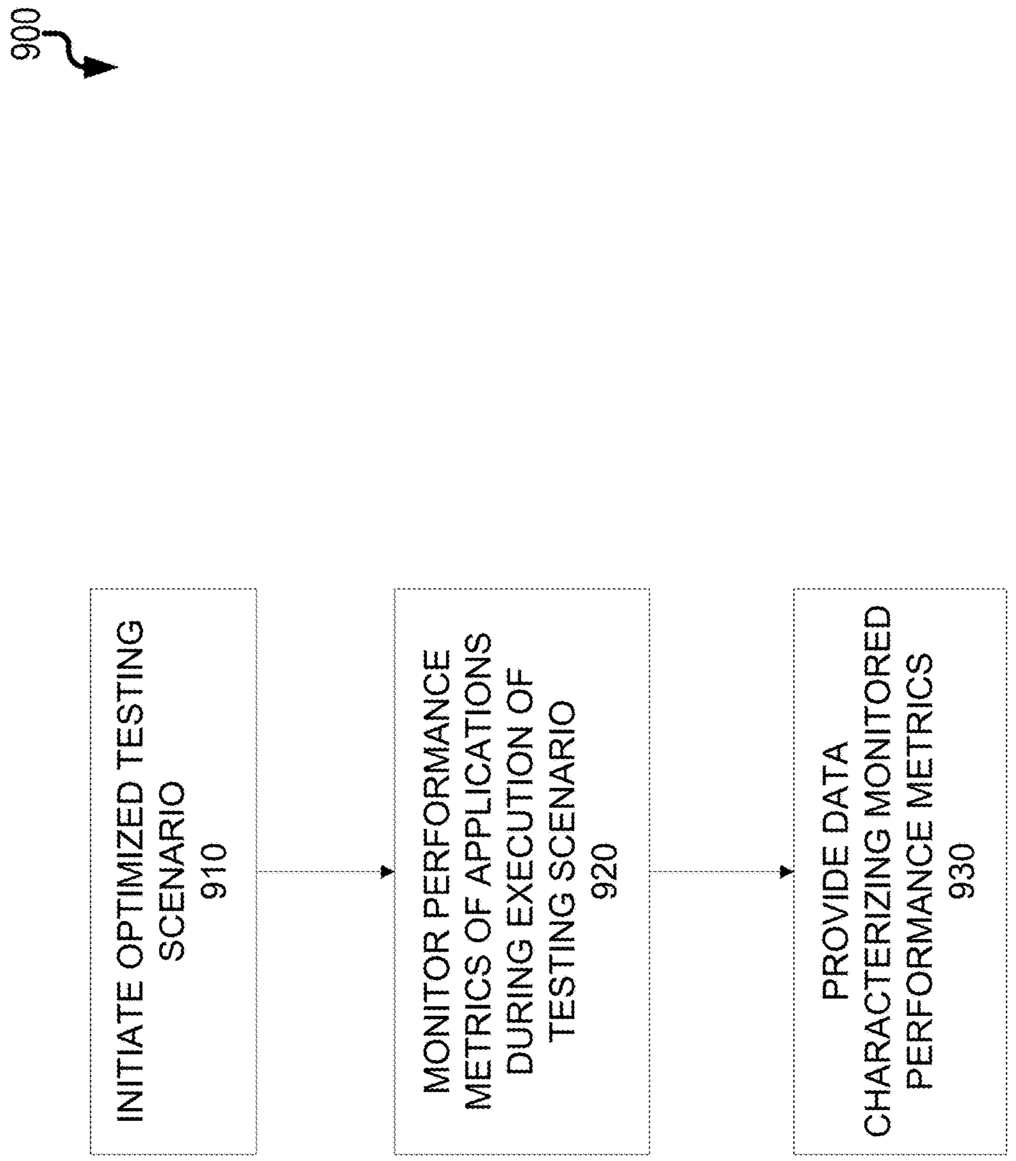
FIG. 9 is a process flow diagram illustrating application testing using OPT-AI as provided herein.

FIG. 9 is a diagram 900 in which, at 910, a testing scenario (forming part of a computing environment executing a plurality of applications) is initiated to characterize performance of the applications. During the execution of the testing scenario, at 920, various performance metrics associated with the applications are monitored. Thereafter, at 930, data characterizing the performance metrics is provided. The testing scenario is generated by monitoring service calls being executed by each of a plurality of automates across the applications, generating a service request tree based on the monitored service calls for all of the applications, and removing cyclic dependencies in the service request tree such that reusable testing components are only used once.

Figure 10:
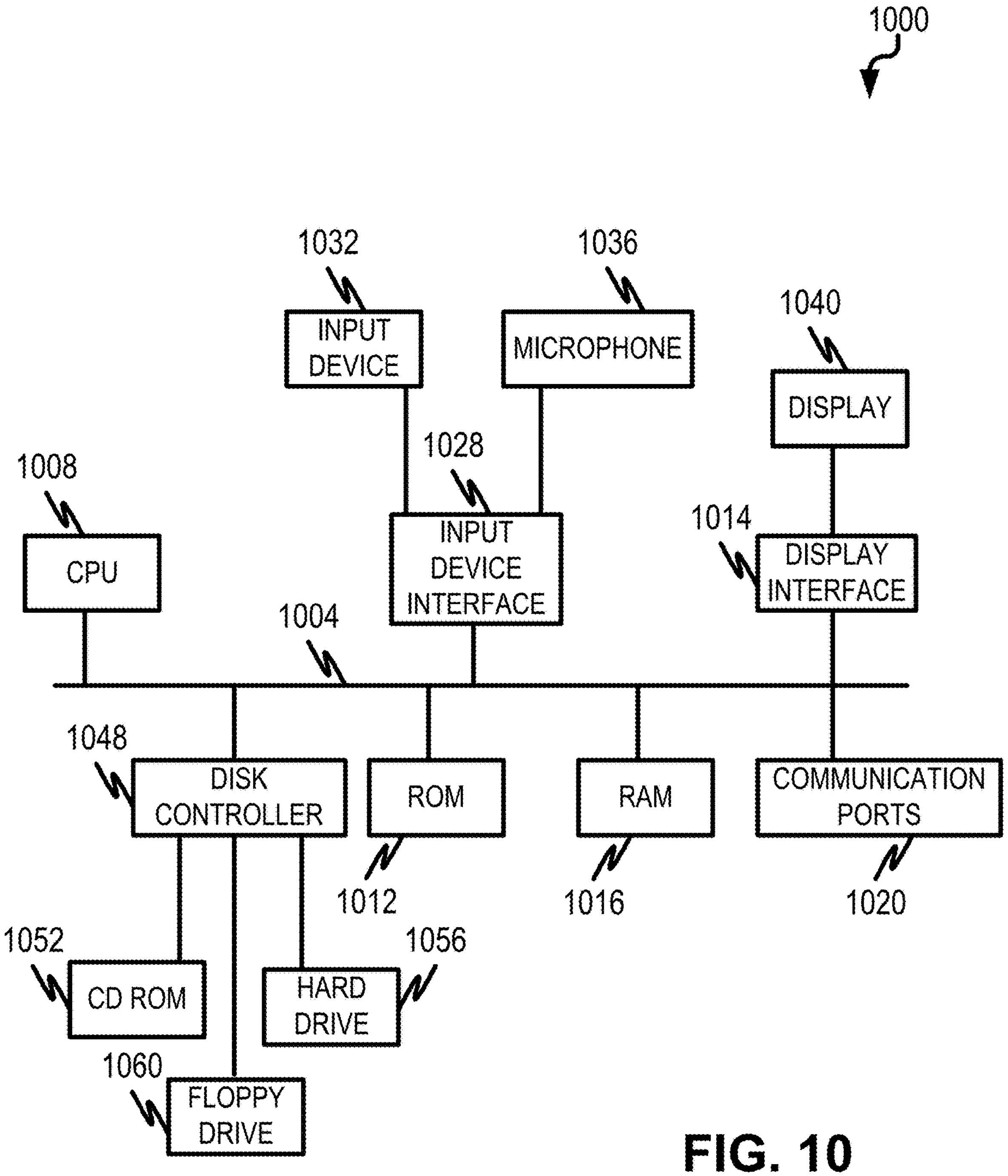
FIG. 10 is a diagram illustrating a computing device for implementing aspects of the current subject matter.

FIG. 10 is a diagram 1000 illustrating a sample computing device architecture for implementing various aspects described herein. A bus 1004 can serve as the information highway interconnecting the other illustrated components of the hardware. A processing system 1008 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1012 and random access memory (RAM) 1016, can be in communication with the processing system 1008 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1048 can interface with one or more optional disk drives to the system bus 1004. These disk drives can be external or internal floppy disk drives such as 1060, external or internal CD-ROM, CD-R, CD-RW or DVD, or solid state drives such as 1052, or external or internal hard drives 1056. As indicated previously, these various disk drives 1052, 1056, 1060 and disk controllers are optional devices. The system bus 1004 can also include at least one communication port 1020 to allow for communication with external devices either physically connected to the computing system or available externally through a wired or wireless network. In some cases, the at least one communication port 1020 includes or otherwise comprises a network interface.

To provide for interaction with a user, the subject matter described herein can be implemented on a computing device having a display device 1040 (e.g., a CRT (cathode ray tube) or LCD (liquid crystal display) monitor) for displaying information obtained from the bus 1004 via a display interface 1014 to the user and an input device 1032 such as keyboard and/or a pointing device (e.g., a mouse or a trackball) and/or a touchscreen by which the user can provide input to the computer. Other kinds of input devices 1032 can be used to provide for interaction with a user as well; for example, feedback provided to the user can be any form of sensory feedback (e.g., visual feedback, auditory feedback by way of a microphone 1036, or tactile feedback); and input from the user can be received in any form, including acoustic, speech, or tactile input. The input device 1032 and the microphone 1036 can be coupled to and convey information via the bus 1004 by way of an input device interface 1028. Other computing devices, such as dedicated servers, can omit one or more of the display 1040 and display interface 1014, the input device 1032, the microphone 1036, and input device interface 1028.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

executing, as part of a computing environment that is running a plurality of different applications, a single testing scenario to characterize performance of each application of the plurality of different applications, wherein the single testing scenario comprises a single path test along which all of the plurality of different applications are tested;

monitoring, during the execution of the single testing scenario, various performance metrics associated with the plurality of different applications; and providing data characterizing the performance metrics, wherein the single path test is generated by:

monitoring different service calls being executed by each of a plurality of automates across the plurality of different applications, generating a service request tree based on the different monitored service calls for all of the applications, identifying a longest path in the service request tree as a critical path, and modifying the critical path by removing cyclic dependencies in the service request tree to form an improved critical path, such that when the improved critical path is used as the single path test, reusable testing components used by multiple applications are only executed once across all of the different monitored service calls.

2. The method of claim 1, wherein the providing data comprises at least one of: displaying the data characterizing the performance metrics, loading the data characterizing the performance metrics into memory, storing the data characterizing the performance metrics, or transmitting the data characterizing the performance metrics to a remote computing system.

3. The method of claim 1, wherein the service calls are according to an open data protocol (ODATA).

4. The method of claim 3, wherein the single testing scenario only executes each ODATA service call once.

5. The method of claim 1, wherein the computing environment comprises a plurality of clients executing the plurality of different applications in connection with a cloud-based server.

6. The method of claim 1, wherein the monitoring comprises:

capturing and storing snippets of the calls.

7. The method of claim 6, wherein the monitoring further comprises:

capturing and storing entity set details for the calls.

8. A system comprising:

at least one data processor; and memory storing instructions which, when executed by the at least one data processor, result in operations comprising:

executing, as part of a computing environment that is running a plurality of different applications, a single testing scenario to characterize performance of each application of the plurality of different applications, wherein the single testing scenario comprises a single path test along which all of the plurality of different applications are tested;

monitoring, during the execution of the single testing scenario, various performance metrics associated with the plurality of different applications; and providing data characterizing the performance metrics, wherein the single testing scenario is generated by:

monitoring different service calls being executed by each of a plurality of automates across the plurality of different applications, generating a service request tree based on the different monitored service calls for all of the applications, identifying a longest path in the service request tree as a critical path, and modifying the critical path by removing cyclic dependencies in the service request tree to form an improved critical path, such that when the improved critical path is used as the single path test, reusable testing components used by multiple applications are only executed once across all of the different monitored service calls.

9. The system of claim 8, wherein the providing data comprises at least one of: displaying the data characterizing the performance metrics, loading the data characterizing the performance metrics into memory, storing the data characterizing the performance metrics, or transmitting the data characterizing the performance metrics to a remote computing system.

10. The system of claim 8, wherein the service calls are according to an open data protocol (ODATA).

11. The system of claim 10, wherein the single testing scenario only executes each ODATA service once.

12. The system of claim 8, wherein the computing environment comprises a plurality of clients executing the plurality of different applications in connection with a cloud-based server.

13. The system of claim 8, wherein the monitoring comprises:

capturing and storing snippets of the calls.

14. The system of claim 13, wherein the monitoring further comprises:

capturing and storing entity set details for the calls.

15. A non-transitory computer program product storing instructions which, when executed by at least one computing device, result in operations comprising:

executing, as part of a computing environment that is running a plurality of different applications, a single testing scenario to characterize performance of each application of the plurality of different applications, wherein the single testing scenario comprises a single path test along which all of the plurality of different applications are tested;

monitoring, during the execution of the single testing scenario, various performance metrics associated with the plurality of different applications; and providing data characterizing the performance metrics, wherein the single testing scenario is generated by:

monitoring different service calls being executed by each of a plurality of automates across the plurality of different applications, generating a service request tree based on the different monitored service calls for all of the applications by identifying whether each called service corresponding to the different monitored service calls has a corresponding root node reference in a hashmap, generating, using a cloud reporting tool, a longest path in the service request tree as a critical path, and modifying the critical path by removing cyclic dependencies in the service request tree to form an improved critical path, such that when the improved critical path is used as the single path test, reusable testing components used by multiple applications are only executed once across all of the different monitored service calls, and wherein:

the providing data comprises at least one of: displaying the data characterizing the performance metrics, loading the data characterizing the performance metrics into memory, storing the data characterizing the performance metrics, or transmitting the data characterizing the performance metrics to a remote computing system.

16. The computer program product of claim 15, wherein:

the service calls are according to an open data protocol (ODATA);

the single testing scenario only executes each ODATA service once; and the computing environment comprises a plurality of clients executing the plurality of different applications in connection with a cloud-based server.

17. The computer program product of claim 16, wherein the monitoring comprises:

capturing and storing snippets of the calls; and capturing and storing entity set details for the calls.

18. The computer program product of claim 15 further comprising: validating the performance metrics against one or more predetermined performance thresholds.

* * * * *